Oct. 4, 1927.

J. P. PRALL 1,644,609

NONPNEUMATIC TIRE FILLER

Filed Nov. 11, 1926

WITNESSES

INVENTOR
James P. Prall
BY
ATTORNEY

Patented Oct. 4, 1927.

1,644,609

UNITED STATES PATENT OFFICE.

JAMES P. PRALL, OF WOODBRIDGE, NEW JERSEY.

NONPNEUMATIC-TIRE FILLER.

Application filed November 11, 1926. Serial No. 147,802.

This invention relates to tires for vehicle wheels and has particular reference to an improvement in a resilient filler for a tire shoe to take the place of the usual inflated inner tube and to eliminate the disadvantages and defects incident to the use of inflated inner tubes.

The invention primarily comprehends a resilient filler for a vehicle tire which functions to hold the shoe normally expanded while tensioning the same against compression sufficiently to absorb the shocks and jars incident to the travel of the vehicle over the road bed, while eliminating the trouble and inconvenience of punctures or blow-outs which are commonly experienced where the shoe is filled with an inflated inner tube.

More specifically the invention comprehends a filler for a tire shoe which includes an annular coil spring element, a contractible and expansible member encircling the same and provided with radially projecting circumferentially spaced means engaging between certain of the adjacent convolutions of the spring element for preventing creeping or relative circumferential movement between the spring element and band.

The invention furthermore contemplates protective yieldable coverings for the spring element and band for preventing chafing or wear on the casing.

In addition to the other objects, the invention comprehends a filler for tire shoes which is comparatively simple in its construction inexpensive to produce and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications of which properly fall within the scope of said claims may be resorted to when found expedient.

In the drawings—

Figure 1:
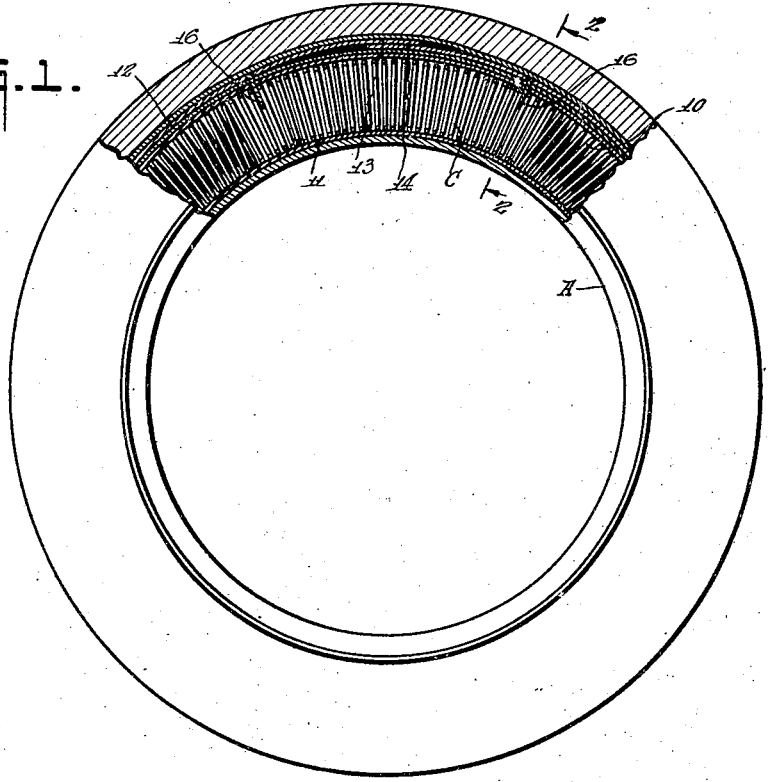
Figure 1 is a side view of a tire equipped with a filler in accordance with the invention, parts being broken away and shown in section disclosing the underlying structure.
Figure 2:
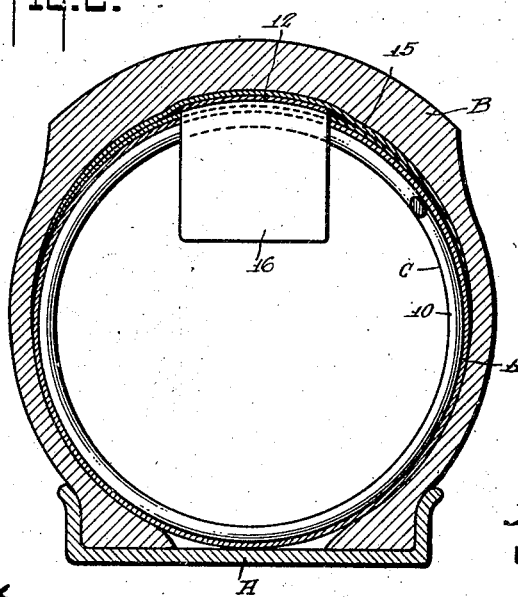
Figure 2 is an enlarged transverse sectional view taken approximately on the line 2—2 of Figure 1.

Referring to the drawings by characters of reference A designates the vehicle rim, and B any approved type or form of outer shoe or casing. The filler element designated generally by the reference character C includes an annular coil spring 10 which is preferably covered with a yieldable or flexible resilient covering sheath 11 to eliminate chafing or wear on the inner surface of the casing or shoe B. A band 12 of resilient material which is contractible and expansible due to the fact that its opposite ends 13 and 14 are overlapped, encircles the spring 10 and the said band is housed or sheathed in a covering 15 which is preferably of a yieldable or flexible resilient material. In order to preclude relative circumferential movement or creeping of the band and spring the band is provided with a plurality of circumferentially spaced radial inwardly projecting plates 16 which extend through apertured portions in the sheath 11 and are positioned between certain of the adjacent convolutions of the spring 10.

In use the spring 10 together with the band 12 is inserted within the casing or shoe B after which the assemblage is mounted on the rim A. The spring 10 serves to expand and fill the casing or shoe B and exerts a sufficient tension radially thereon to yieldably support the load of the vehicle while allowing for enough compression to cushion the vehicle against the shocks and jars incident to its travel over the road bed.

From the foregoing it will thus be seen that a non-pneumatic filler for tire shoes has been devised which, while possessing all the virtues and advantages of a pneumatic filler eliminates the troubles and disadvantages in that punctures or blow-outs are precluded.

What I claim is:

1. A non-pneumatic filler for tire shoes including an annular coil spring element and yieldable means embracing the same and provided with means engaging between the convolutions to prevent creeping or relative circumferential movement of said yieldable means and the spring, and flexible resilient coverings provided respectively on the coil spring element and said means.

2. In a tire a non-pneumatic filler for the tire shoe including an annular coil spring element, a contractible and expansible band encircling the same, circumferentially spaced radial projecting members on the band positioned between certain of the convolutions of the coil spring element, the said band having overlapped ends permitting of its contraction and expansion, and flexible resilient covering sheaths provided respectively on the coil spring element and the band.

JAMES P. PRALL.